US011686143B2

(12) United States Patent
Kerr

(10) Patent No.: US 11,686,143 B2
(45) Date of Patent: Jun. 27, 2023

(54) POWER TAILGATE CONTROL SYSTEM AND METHOD

(71) Applicant: Toyota Motor Engineering & Manufacturing North America, Inc., Plano, TX (US)

(72) Inventor: Norman C. Kerr, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 982 days.

(21) Appl. No.: 16/429,759

(22) Filed: Jun. 3, 2019

(65) Prior Publication Data
US 2020/0378170 A1    Dec. 3, 2020

(51) Int. Cl.
*E05F 15/622* (2015.01)
*B60J 5/10* (2006.01)
*E05F 15/70* (2015.01)
*E05F 15/63* (2015.01)

(52) U.S. Cl.
CPC ............. *E05F 15/622* (2015.01); *B60J 5/102* (2013.01); *E05F 15/63* (2015.01); *E05F 15/70* (2015.01); *E05Y 2900/546* (2013.01)

(58) Field of Classification Search
CPC ......... B60J 5/102; E05F 15/70; E05F 15/622; B62D 33/03
See application file for complete search history.

(56) References Cited

U.S. PATENT DOCUMENTS

| 9,048,703 | B2 | 6/2015 | Jang et al. |
| 2004/0212210 | A1 | 10/2004 | Roach |
| 2013/0060403 | A1 | 3/2013 | Kerr |
| 2014/0324251 | A1* | 10/2014 | Hansen .................. E05F 15/63 296/57.1 |
| 2016/0160553 | A1 | 6/2016 | Nania |
| 2017/0045124 | A1 | 2/2017 | Castelblanco et al. |
| 2018/0266161 | A1* | 9/2018 | Jergess .................. E05F 15/611 |
| 2020/0002995 | A1* | 1/2020 | Salter ..................... E05F 15/70 |
| 2020/0109588 | A1* | 4/2020 | Nania ..................... B62D 33/03 |
| 2021/0301577 | A1* | 9/2021 | Nagase ................. E05F 15/611 |

* cited by examiner

Primary Examiner — Gregory J Strimbu
(74) Attorney, Agent, or Firm — Christopher G. Darrow; Darrow Mustafa PC

(57) ABSTRACT

A system and method of operating a power tailgate assembly for a vehicle. The system can detect that a tailgate, connected to the vehicle by a pivotal connection and having an open position and a closed position, is in the open position, detect that the vehicle is being driven, detect, by one or more sensors, a movement of the tailgate, and control a motor assembly to restrain movement of the tailgate and return the tailgate to the open position in response to detecting that the tailgate is in the open position, the vehicle is being driven, and the tailgate has moved more than a threshold amount.

20 Claims, 5 Drawing Sheets

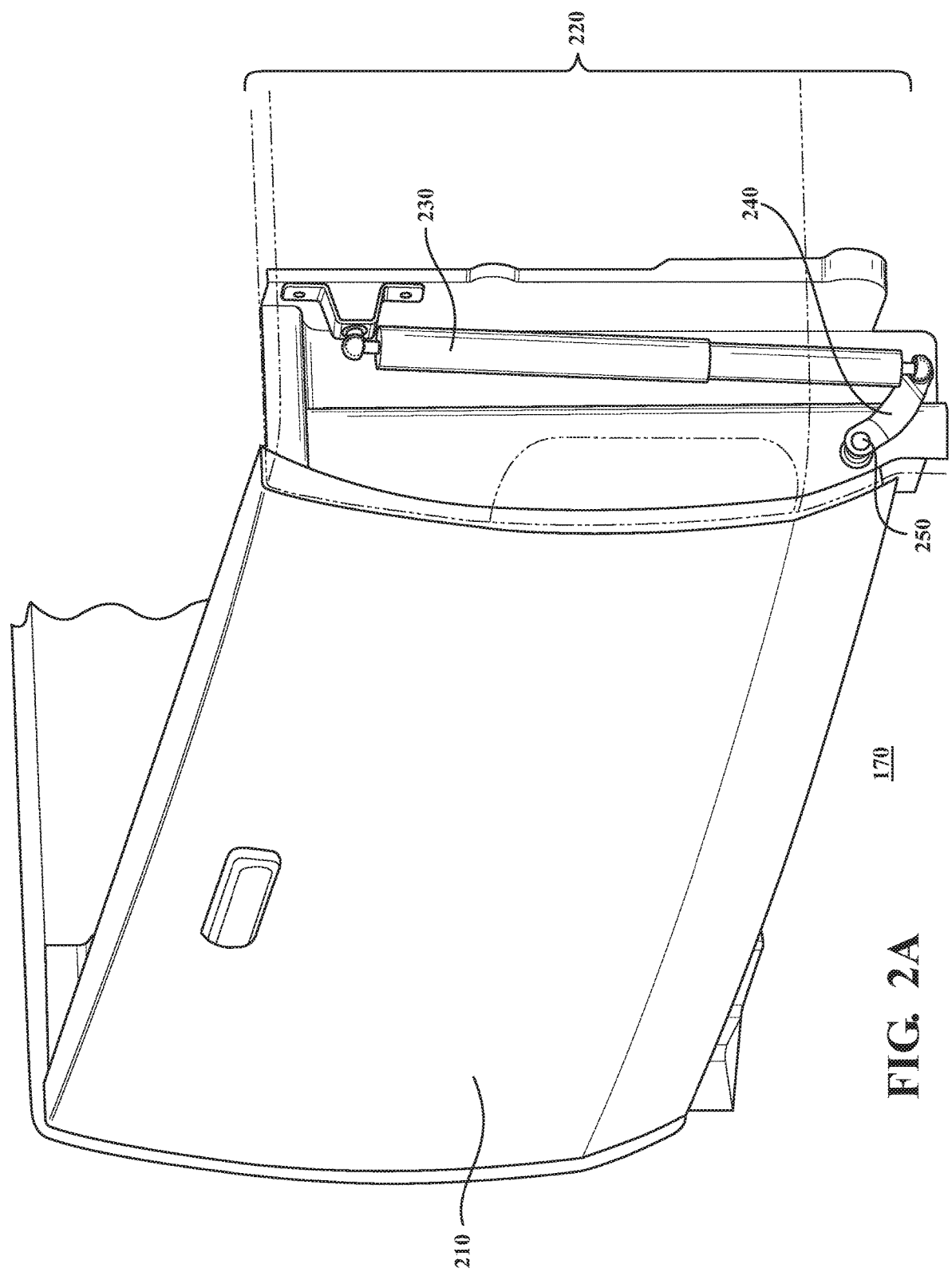

POWER TAILGATE CONTROL SYSTEM AND METHOD

TECHNICAL FIELD

The subject matter described herein relates generally to vehicle tailgates and, in particular, to a power tailgate with anti-bounce functionality.

BACKGROUND

Tailgates, such as pickup truck tailgates, are usually attached to the vehicle by a hinge mechanism at one side that permits rotation of the tailgate from a position that closes a vehicle cargo bed to a position in which the vehicle cargo bed is open. Such tailgates are commonly constructed to be easily removed from the truck, for example, to facilitate backing up to a loading platform. The removal feature is normally possible due to mechanical features in the tailgate that allow the user to rotate the tailgate to one or more removal angles, lift the tailgate, and detach it from the vehicle. The removal process can be performed manually and normally does not require the use of tools, thereby providing the user with the advantage of being able to remove the tailgate by hand in virtually any situation as needed.

Owners of vehicles that have a removable tailgate occasionally drive with the tailgate in an open position, for example, to accommodate a load that is longer than the cargo bed. If the load is not heavy enough to stabilize the tailgate, the tailgate may bounce when the vehicle drives over bumps in a road or drives off-road. If a removable tailgate bounces high enough, the tailgate can incidentally reach the removal angle at which it can become detached from the vehicle while the vehicle is in motion.

Even if the tailgate is not removable, if an open tailgate bounces too high during a drive and slams down, the vehicle and/or the tailgate may be damaged.

To mitigate against accidental bounce detachment, power tailgates are typically designed to omit the easy manual removal feature and are instead securely fastened to the vehicle such that the tailgate cannot be removed without using tools. This construction effectively removes the risk of bounce detachment but decreases the usability of the tailgate for the user.

SUMMARY

Embodiments described herein disclose a power tailgate system with anti-bounce functionality that can detect movement of an open tailgate, restrain the movement, and return the tailgate to an open position. In one embodiment, the disclosed power tailgate can be manually removable, i.e., detachable by a rotation sequence that does not require tools. When a bounce occurs, the disclosed system detects movement of the tailgate, identifies the movement as a bounce occurring while the vehicle is being driven, assesses the severity of the bounce, appropriately prevents any further movement of the tailgate before the tailgate reaches the removal position, and returns the tailgate to the open position. Thus, the power tailgate can retain the easy removal functionality while reducing the risk of accidental detachment due to incidental bouncing while driving.

In one embodiment, a power tailgate assembly for a vehicle includes a tailgate connected to the vehicle by a pivotal connection, the tailgate having an open position and a closed position, a motor assembly connected to the tailgate and configured to cause the tailgate to move between the closed position and the open position, one or more sensors configured to detect movement of the tailgate, one or more processors, and a memory communicably connected to the one or more processors and storing a control logic module including instructions that when executed by the one or more processors cause the one or more processors to control the motor assembly to restrain movement of the tailgate and return the tailgate to the open position when the processor determines that: 1) the tailgate is open, 2) the vehicle is being driven, and 3) the one or more sensors detect movement of the tailgate above a threshold amount.

In another embodiment, a method of operating a power tailgate assembly for a vehicle, includes detecting that a tailgate, connected to the vehicle by a pivotal connection and having an open position and a closed position, is in the open position, detecting that the vehicle is being driven, detecting, by one or more sensors, a movement of the tailgate, and in response to detecting that the tailgate is in the open position, the vehicle is being driven, and the tailgate has moved more than a threshold amount, controlling a motor assembly to restrain movement of the tailgate and return the tailgate to the open position.

In another embodiment, a vehicle including a power tailgate assembly, the assembly includes a tailgate connected to the vehicle by a pivotal connection, the tailgate having an open position and a closed position, a motor assembly connected to the tailgate, configured to cause the tailgate to move between the closed position and the open position, one or more sensors configured to detect movement and speed of movement of the tailgate, one or more processors, and a memory communicably connected to the one or more processors and storing a control logic module including instructions that when executed by the one or more processors cause the one or more processors to control the motor assembly to restrain movement of the tailgate and return the tailgate to the open position when the processor determines that: 1) the tailgate is open, 2) the vehicle is being driven, and 3) the one or more sensors detect movement and speed movement of the tailgate above threshold amounts.

BRIEF DESCRIPTION OF THE DRAWINGS

The accompanying drawings, which are incorporated in and constitute a part of the specification, illustrate various embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

FIG. 2A illustrates an embodiment of a tailgate in a closed position according to the disclosed subject matter.

DETAILED DESCRIPTION

This detailed description relates to a power tailgate with anti-bounce functionality. Detailed embodiments are disclosed herein, however, it is to be understood that the disclosed embodiments are intended only as examples. Specific structural and functional details disclosed herein are not to be interpreted as limiting, but merely as a basis for the claims and as a representative basis for teaching one skilled in the art to variously employ the features described herein in virtually any appropriately detailed structure. Further, the terms and phrases used herein are not intended to be limiting but rather to provide an understandable description of possible implementations.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
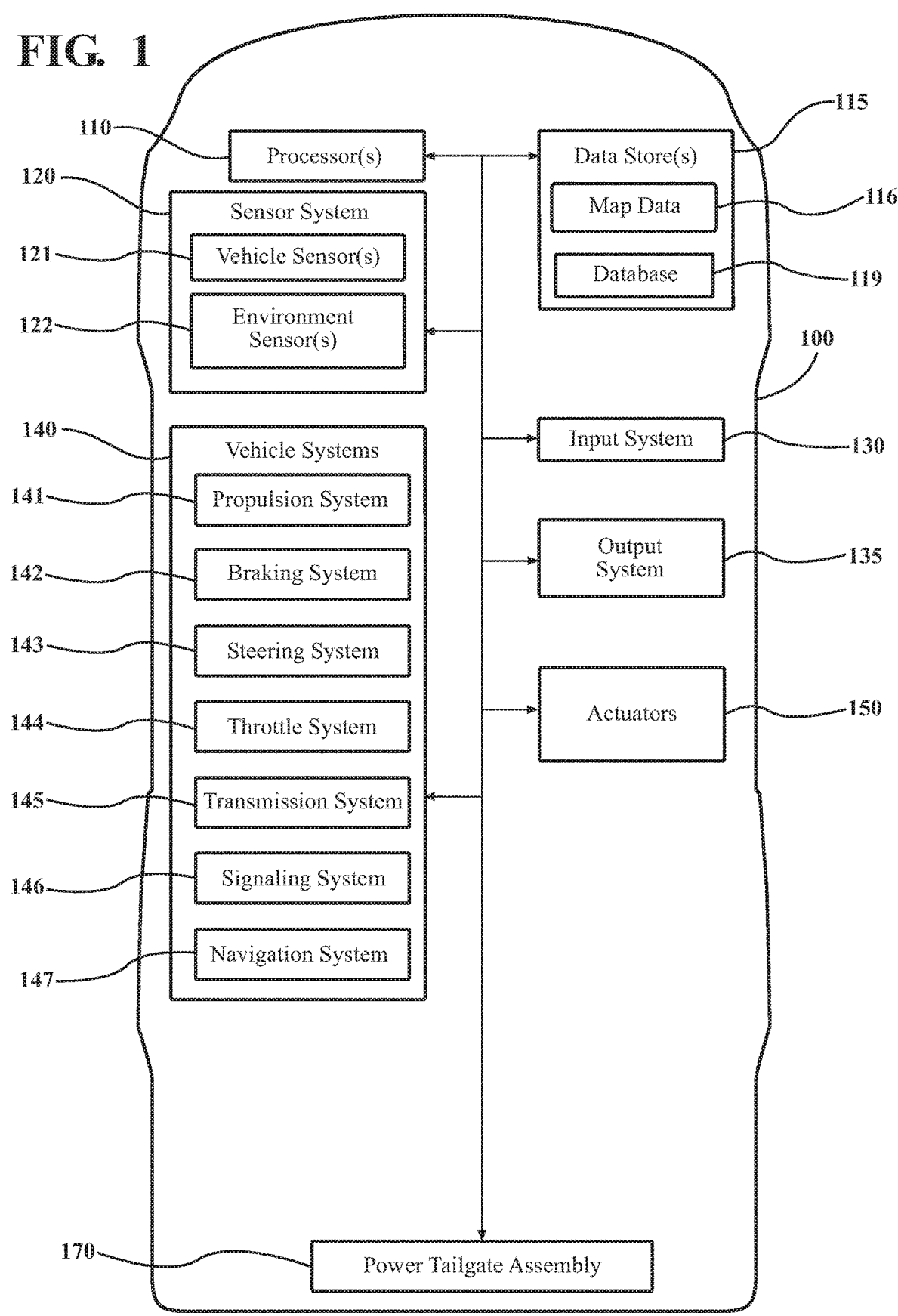
FIG. 1 illustrates one embodiment of a vehicle within which systems and methods disclosed herein may be implemented.

In order to avoid accidental detachment of a power tailgate that is open while a vehicle is driving, a power tailgate assembly with anti-bounce functionality and control is disclosed. Referring to FIG. 1, an example of a vehicle 100 is illustrated. As used herein, a "vehicle" is any form of powered transport that includes a tailgate. For example, in one or more implementations the vehicle 100 is a pickup truck including a cargo bed with a tailgate.

As shown in FIG. 1, the vehicle 100 includes multiple elements. It should be understood that in various embodiments it may not be necessary for the vehicle 100 to include all of the elements shown in FIG. 1. The vehicle 100 can include any combination of the various elements shown in FIG. 1. Further, the vehicle 100 can include other elements in addition to those shown in FIG. 1. In some arrangements, the vehicle 100 may be implemented without one or more of the elements shown in FIG. 1. While the various elements are shown as being located within the vehicle 100 in FIG. 1, it should be understood that one or more of these elements can be located external to the vehicle 100. Further, the elements shown may be physically separated by large distances.

Some of the possible elements of the vehicle 100 are shown in FIG. 1 and will be described along with subsequent figures. However, a more detailed description of many of the elements in FIG. 1 will be provided after the discussion of FIGS. 2A-5 for purposes of brevity in this description. For simplicity and clarity of illustration, reference numerals have been repeated among the different figures to indicate corresponding or analogous elements when appropriate. In addition, while the discussion outlines numerous specific details to provide a thorough understanding of the embodiments described herein, those of skill in the art, will understand that the embodiments described herein may be practiced using various combinations of these elements.

In any case, the vehicle 100 includes a power tailgate assembly 170 that is implemented to open and close a tailgate and perform methods and other functions as disclosed herein relating to bounce control and prevention, including monitoring sensor data, detecting movement of a tailgate under particular circumstances, restraining the movement, and controlling a motor to move the tailgate back into an open position. The noted functions and methods will become more apparent in the following discussion of the figures.

Figure 2B:
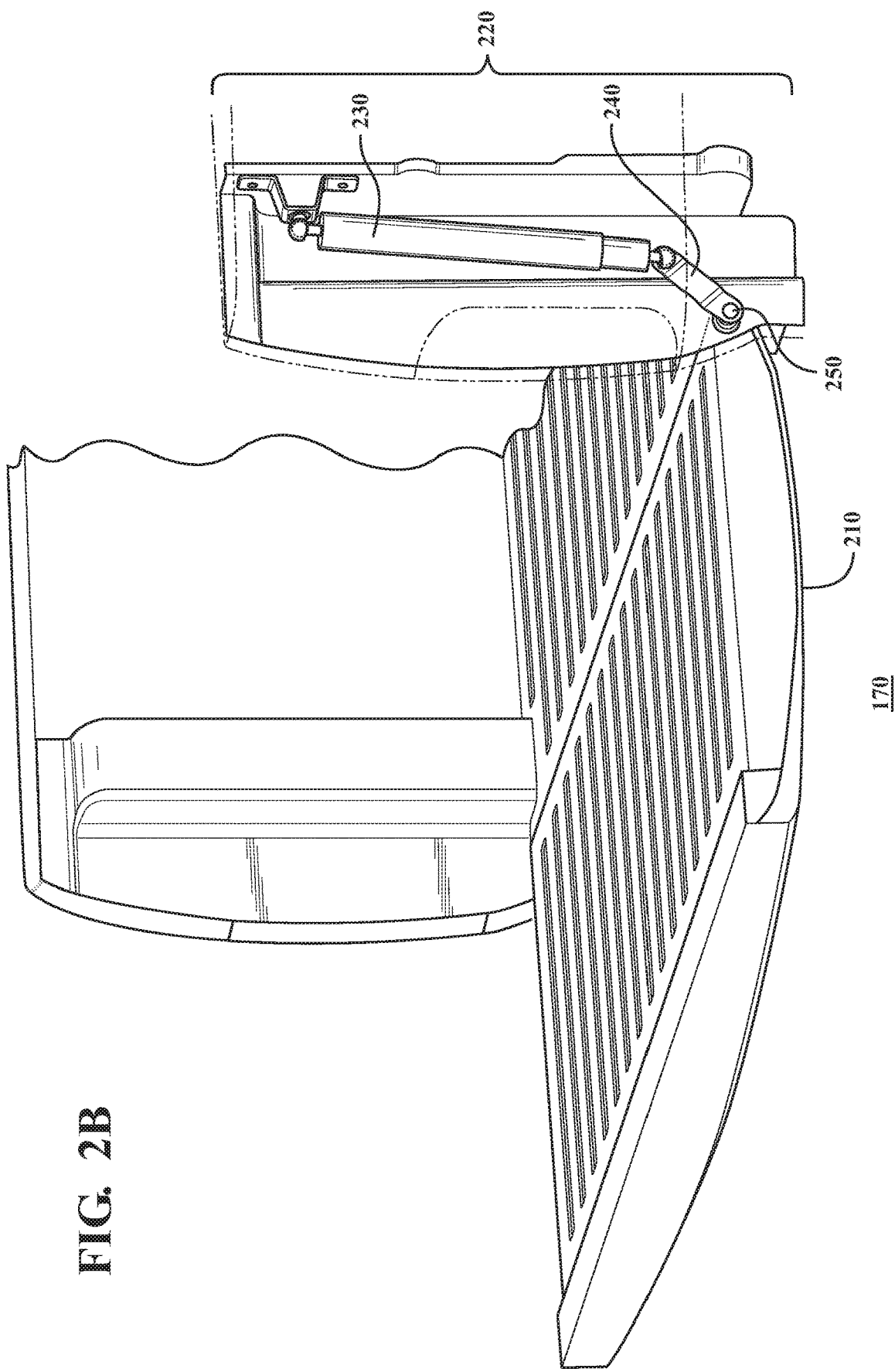
FIG. 2B illustrates an embodiment of a tailgate in an open position according to the disclosed subject matter.

FIGS. 2A and 2B show isolated views of a power tailgate assembly 170 in a closed position (FIG. 2A) and an open position (FIG. 2B). The power tailgate assembly 170 includes a tailgate 210 and a motor assembly 220 that is connected to the tailgate 210 and configured to cause the tailgate 210 to move between the closed and open positions. In one or more embodiments, the tailgate 210 is attached to the vehicle 100 on a pivotal connection, e.g. a hinge mechanism 250, which permits rotary motion of the tailgate 100 between the closed and open positions. In one or more embodiments the hinge mechanism 250 includes a brace (not shown) having an open section that defines a removal position that allows the tailgate 210 to be manually removed from the vehicle 100 when the tailgate 210 is pivoted to a removal angle. For example, the removal angle can be defined as an angle that aligns a specifically shaped post (not shown) attached to the tailgate 210 to fit through an open section of the hinge mechanism 250.

In one or more embodiments, the motor assembly 220 can include a spindle drive 230 connected to a hinge arm 240, which is in turn connected to the hinge mechanism 250. The spindle drive 230 is shown in an extended disposition in the closed tailgate 210 shown in FIG. 2A and a contracted disposition in the open tailgate 210 shown in FIG. 2B. As will be described further below, the spindle drive 230 is constructed to functionally extend or contract to move the hinge arm 240 which in turn causes the tailgate 210 to pivot on the hinge mechanism 250 between the open and closed positions.

Figure 3:
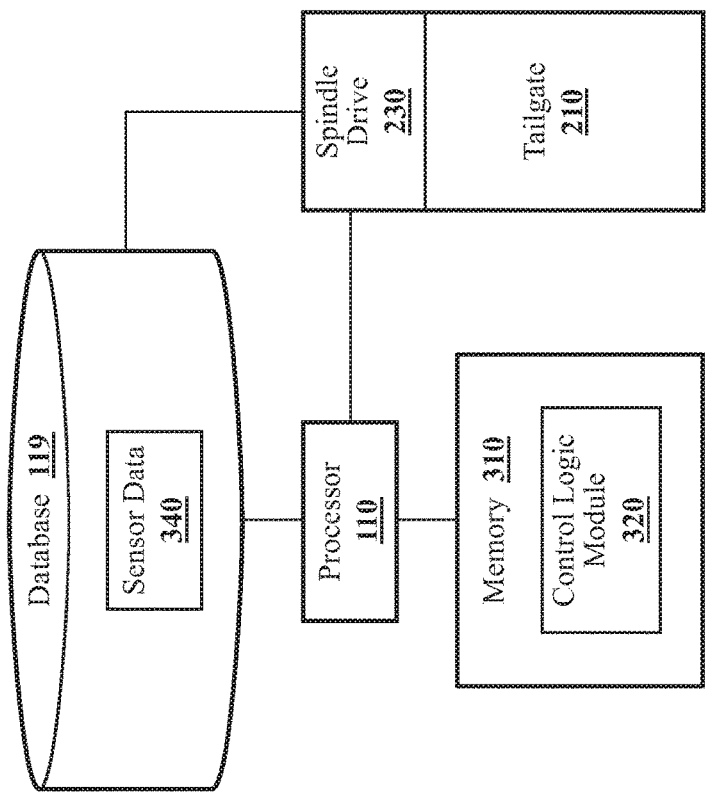
FIG. 3 illustrates operational components of an embodiment of a tailgate assembly according to the disclosed subject matter.

FIG. 3 shows a block diagram of one embodiment of operational components of the tailgate assembly 170 of FIG. 1. In one embodiment the tailgate assembly 170 includes the tailgate 210, a memory 310 that stores a control logic module 320, the spindle drive 230, a processor 110 that executes instructions according to the control logic module 320, and a database 119 that stores sensor data 340 received from one or more sensors components of the spindle drive 230.

The tailgate assembly 170 is shown as including a processor 110 and database 119 from the vehicle 100 of FIG. 1. Accordingly, the processor 110 may be a part of the tailgate assembly 170, the tailgate assembly 170 may include a separate processor from the processor 110 of the vehicle 100, or the tailgate assembly 170 may access the processor 110 through a data bus or another communication path.

The memory 310 is a random-access memory (RAM), read-only memory (ROM), a flash memory, or other suitable memory for storing the control logic module 320. The control logic module 320 can be constructed, for example, as computer-readable instructions that when executed by the processor 110 cause the processor 110 to perform the various functions discussed further below.

The tailgate assembly 170 includes a database 119 which stores the sensor data 340 from the spindle drive 230, which will be described further below. The database 119 is, in one embodiment, constructed as an electronic data structure stored in the memory 310 or another data store, such as the vehicle 100 data store 115, a cloud-based storage, a removable memory device, or another suitable location that is accessible to the control logic module 320. The database 119 is configured with routines that can be executed by the processor 110 for analyzing stored data, providing stored data, organizing stored data, and so on. Thus, in one embodiment, the database 119 stores data described above (as well as other data) used by the control logic module 320 in executing various functions.

Figure 4:
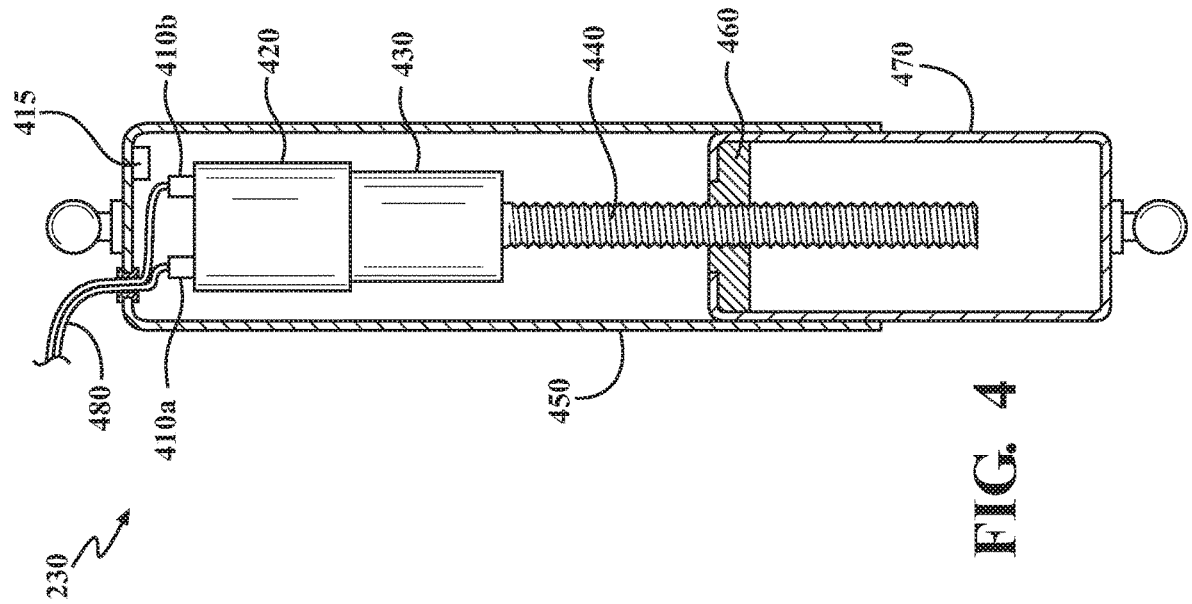
FIG. 4 illustrates an embodiment of a spindle drive according to the disclose subject matter.

FIG. 4 shows a diagram of various details of the spindle drive 230 and several of its internal components aligned along a common longitudinal axis, including one or more sensors 410a, 410b, a magnetic element 415, a rotary motor 420, a gearbox 430, and a spindle screw 440 enclosed in an upper housing 450, and a spindle nut 460 enclosed in a lower housing 470 that can telescopically enter the upper housing 450. A wire harness 480 provides power, communication and control connections to the motor 420 and one or more tailgate movement sensors 410a, 410b. It should be understood that the spindle drive 230 can include additional components that are not expressly shown.

The rotary motor 420 receives control signals and generates a rotational movement in either a clockwise or counter-clockwise direction, depending on whether the control signal is intended to open or close the tailgate 210. The rotational movement is outputted from the motor 420 and transferred to the spindle screw 440 via the gearbox 430, which can contain a plurality of speed reduction gears. Rotation of the spindle screw 440 moves the spindle screw 440 through the spindle nut 460 in either vertical direction, depending on the direction of rotational movement transferred from the motor 420, and thereby coverts the rotational movement output of the motor 420 into a vertically directed force that causes the lower housing 470 to telescopically extend from or draw into the upper housing 450.

The sensors 410a, 410b are configured to detect movements that indirectly indicate that movement of the tailgate 210 has occurred. In one or more embodiments the sensors 410a, 410b are implemented as two Hall effect sensors 410a, 410b that are mounted on a rotary component of the rotary motor 420, or on a gear driven by the rotary motor 420. A stationary magnetic element 415 is fixed proximate to the sensors 410a, 410b. As the rotary element, which the sensors 410a, 410b are mounted on, rotates, each sensor enters and exits the magnetic field of the magnetic element 415 and in turn generates a respective signal. The sensors 410a, 410b can be positioned relative to each other such that an output signal from one Hall effect sensor 410a is phase-shifted approximately 90 degrees relative to an output signal of the other Hall effect sensor 410b. The output signals from the sensors 410a, 410b are stored in the database 119 for processing by the processor 110 and the control logic module 320.

Turning now to the control logic module 320, the module 320 generally includes instructions that function to control the processor 110 to, when certain monitoring conditions are met, detect movement of the tailgate 210, restrain the movement, and return the tailgate 210 to an open position. In one or more embodiments, the monitoring conditions include: 1) the vehicle 100 is in motion, i.e., being driven, and 2) the tailgate 210 is open. Conversely, in one or more other embodiments, the monitoring conditions can include: 1) the vehicle 100 is in motion, i.e., being driven, and 2) the tailgate 210 is closed.

In one or more embodiments the control logic module 320 can determine that the vehicle 100 is being driven based on signals received from one or more of the vehicle systems 140 shown in FIG. 1. For example, the control logic module 320 can determine that the vehicle 100 is being driven based on a signal from the transmission system 145 indicating that the transmission of the vehicle 100 is currently shifted out of park, or based on a signal indicating that a current speed of the vehicle 100 is greater than a threshold amount, e.g., 5 mph.

The control logic module 320 can determine whether the tailgate 210 is open. For example, the tailgate 210 can include a detector (not shown), for example on the hinge mechanism, the tailgate 210 latch or elsewhere, that provides a signal to the control logic module 320 to indicate whether the tailgate 210 is open or closed.

When the tailgate 210 moves, the control logic module 320 can determine which direction the tailgate 210 is moving in based on the order of signals received from the sensors 410a, 410b. The position of the sensors 410a, 410b relative to the magnetic element 415 when the tailgate 210 is in the open position or the closed position can represent a known initial state. Thus, for example, from a known initial state in the open position, when a signal from sensor 410a precedes a signal from sensor 410b, the control logic module 320 can determine that the tailgate 210 is moving in a known direction (e.g., closing). Conversely, a signal from sensor 410b preceding a signal from sensor 410a from the known state of the closed position indicates that the tailgate 210 is moving in the opposite direction (e.g., opening).

The control logic module 320 can further determine how fast the tailgate 210 is moving based on the rate of change of the signals from sensors 410a, 410b. That is, a higher rate of change indicates faster movement while a lower rate of change indicates slower movement.

When the control logic module 320 determines that the monitoring conditions are met, e.g., the vehicle 100 is being driven and the tailgate 210 is open, the control logic module 320 monitors signals from the sensors 410a, 410b to detect whether the sensor data matches criterion of a significant and possibly dangerous bounce occurring.

As an example, assume that the sensors 410a, 410b are in an initial open state from which the signal pattern 410a->410b indicates the tailgate 210 is moving in a closing direction. In one embodiment, when the control logic module 320 detects the 410a->410b signal pattern, it checks the rate of change of the sensor 410a, 410b signals. If the rate of change is above a threshold, i.e., indicating that the tailgate 210 is moving rapidly toward the closed position, the control logic module 320 activates the motor assembly 220 to restrain any further movement and return the tailgate 210 to an open position.

It should be understood that this is merely one example implementation provided as a general illustration. Further details and other embodiments using different thresholds and different responses will be described further below.

Figure 5:
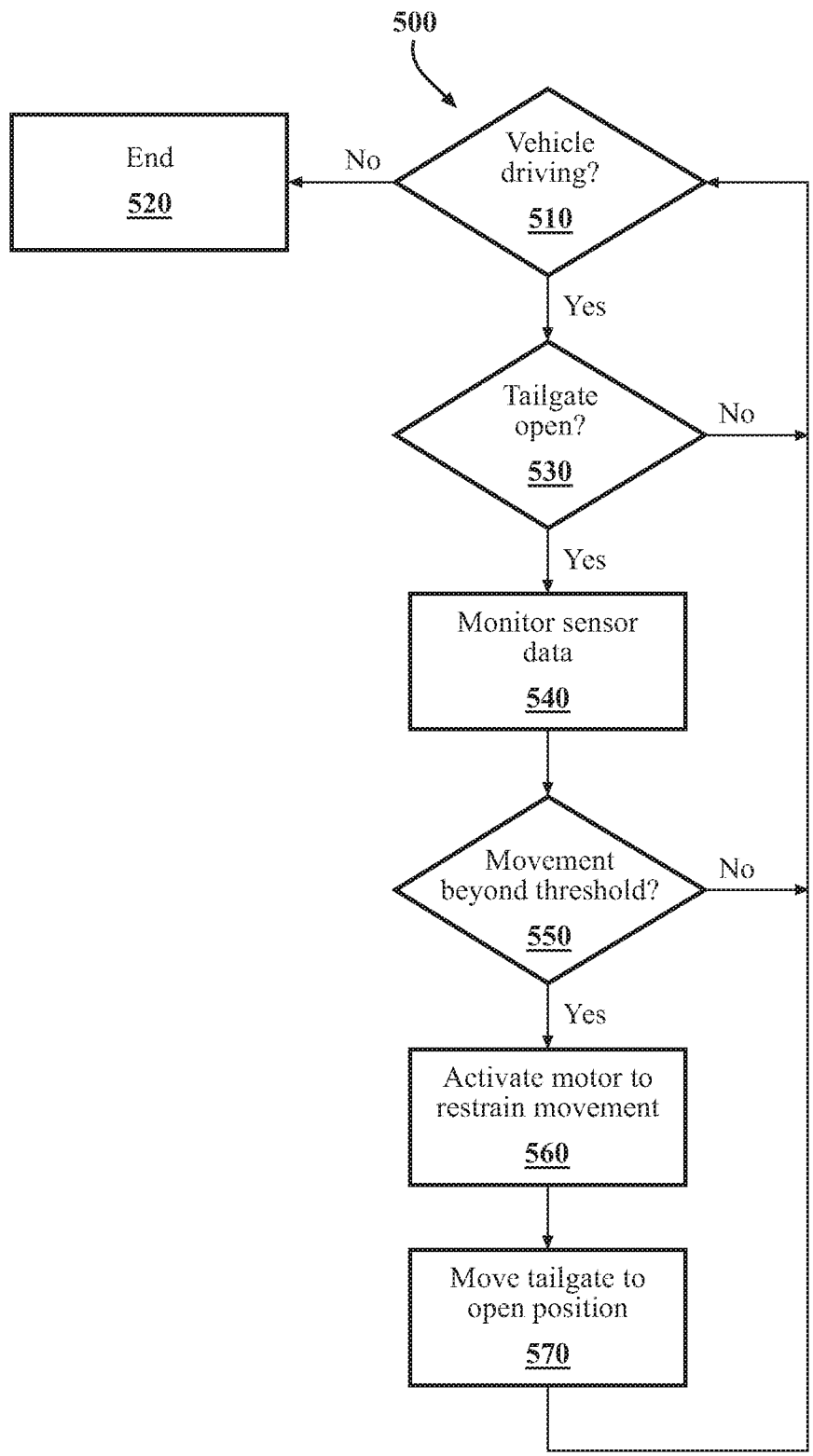
FIG. 5 illustrates an example method of controlling a tailgate according to the disclosed subject matter.

FIG. 5 shows a flowchart of an example method 500 of controlling a tailgate 210 to prevent an accidental removal due to excessive bouncing. At operation 510 the control logic module 320 determines whether the vehicle 100 is being driven. The control logic module 320 can make this determination, for example, based on a signal from one of the vehicle systems 140 indicating the vehicle 100 transmission is shifted out of park, a signal indicating that the vehicle 100 is traveling above a threshold speed (e.g., 5 mph), or another indication that the vehicle 100 is being driven. When the control logic module 320 determines that the vehicle is not being driven the process ends at 520.

When control logic module 320 determines that the vehicle 100 is being driven, then the control logic module 320 determines whether the tailgate 210 is open at operation 530. The control logic module 320 can determine whether the tailgate 210 is open based on, for example, a signal from a detector or latch of the tailgate 210. When the control logic module 320 determines that the tailgate is not open, then the process returns to operation 510 to re-evaluate whether the conditions for monitoring exist.

When the control logic module 320 determines that the vehicle 100 is being driven (operation 510) and the tailgate 210 is open (operation 530), at operation 540 the control logic module 320 monitors sensor data from tailgate movement sensors 410a, 410b.

At operation 550 the control logic module 320 determines whether the sensor data indicates that a threshold for taking responsive action has been breached. For example, in one or more embodiments the control logic module 320 can determine whether the open tailgate 210 has moved (i.e., away from the open position and toward the closed position) farther than a threshold amount. Movement away from the open position can be an indication that a bounce is occurring. The threshold amount of movement can be a predetermined distance set based on the characteristics of vehicle 100, and more particularly in consideration of a height the tailgate 210 must be raised to for manual removal. For example, in one embodiment where the tailgate 210 must be raised to a height of 50 cm, the threshold amount of movement can be set to 10 cm. Generally, the threshold amount can be set to a value that is well below the removal position but that still allows some amount of play for small bounces of the tailgate 210 which present no risk of accidental removal of the tailgate 210, and thus to which the tailgate assembly 170 need not expend energy to respond to.

In one or more embodiments, the control logic module 320 can determine a rate of speed at which the tailgate 210 is moving based on the sensor data and determine whether to take responsive action based on whether the tailgate 210 speed exceeds a predetermined threshold speed. That is, the control logic module 320 can monitor the sensor data to determine whether the tailgate 210 speed increases to a speed greater than the threshold speed, e.g., 200 cm/sec.

In other embodiments, the threshold for taking responsive action can be a combination of speed and movement. For example, the control logic module 320 can determine whether the tailgate 210 is moving faster than a threshold speed and has moved beyond a threshold distance.

At operation 550, when the control logic module 320 determines that the threshold(s) for responsive action has not been breached (e.g., tailgate 210 has not moved beyond a threshold amount and/or not exceeded a threshold speed), the process returns to operation 510 to continue determining whether conditions for further monitoring persist, i.e., determine whether the vehicle 100 is still being driven (operation 510) and whether the tailgate is still in an open position (operation 530). It should be understood that the processing rate of this cycle can be configured to achieve a high degree of speed, e.g., on the order of milliseconds, to ensure that control logic module 320 is capable of immediately reacting to a threat of a potentially hazardous bounce.

When the control logic module 320 determines that the threshold(s) for responsive action has been breached (e.g., the tailgate 210 has moved beyond the threshold amount and/or exceeded a threshold speed), indicating a potentially hazardous bounce may be currently occurring, at operation 560 the control logic module 320 immediately activates the motor 420 to restrain any further movement of the tailgate 210. The control logic module 320 can cause the motor 420 to implement the restraint, for example, by causing the motor 420 to prevent any further movement of the spindle screw 440. In one or more embodiments, the control logic module 320 can also send an alert or notification to an interface of the vehicle 100 to warn the driver that a potentially hazardous bounce may be occurring.

At operation 570 the control logic module 320 can operate the motor 420 to return the tailgate 210 to the fully open position. This opening operation results in executing a controlled descent of the tailgate 210 to an open position as opposed to allowing gravitational pull to potentially slam the tailgate 210 down after being stopped mid-bounce. The opening operation can also serve to avoid a whiplash-like effect, for example, in a scenario in which the rear end of the vehicle encounters a bounce and is propelled upward, transmitting inertia to the tailgate 210 to force it upward, then subsequently falls down, transferring inertia to the tailgate 210 to force it downward at possibly damaging speeds. When the operation of a controlled return to the open position is complete, the process returns to operation 510 to continue determining whether conditions for further monitoring persist.

Thus, the disclosed tailgate assembly 170 can detect when an open tailgate 210 experiences a bounce while the vehicle 100 is being driven, determine whether the bounce is significant enough to be potentially hazardous, restrain the tailgate 210 from reaching the removal position, and return the tailgate 210 to an open position in a controlled, non-damaging manner. While the operations have been described as maintaining an open position, similar operations can be implemented to maintain a closed position, for example, to mitigate against a tailgate 210 accidentally falling open while driving. In such an implementation, the control logic module 320 can monitor for movement in the opposite direction and, instead of returning the tailgate 210 to an open position when a responsive action threshold is breached, return the tailgate 210 to a closed position.

FIG. 1 will now be discussed in full detail as an example environment within which the system and methods disclosed herein may operate. The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can implement the database 119 (FIG. 2) and can further include other information, such as map data 116. The map data 116 can include maps of one or more geographic areas.

As noted above, the vehicle 100 can include the sensor system 120. The sensor system 120 can include one or more sensors. As used herein, the term "sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles, nearby obstacles, road/lane details, etc.).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. As used herein, "driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

The vehicle 100 can include an input system 130. As used herein, an "input system" includes any device, component, system, element or arrangement or groups thereof that enable information/data to be entered into a machine. The input system 130 can receive an input from a vehicle passenger (e.g., a driver or a passenger). The vehicle 100 can include an output system 135. As used herein, an "output system" includes any device, component, or arrangement or groups thereof that enable information/data to be presented to a vehicle passenger (e.g., a person, a vehicle passenger, etc.).

As discussed above, the vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the control logic module 320 can be operatively connected to communicate with the various vehicle systems 140 and/or individual components thereof. For example, returning to FIG. 1, the processor(s) 110 can be in communication to send and/or receive information from the various vehicle systems 140 to control the movement, speed, maneuvering, heading, direction, etc. of the vehicle 100. The control logic module 320 may similarly be in communication with various vehicle systems to send and/or receive information, such as vehicle speed, transmission state, etc.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-5, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, at least some of the arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and as used herein refers to and encompasses any and all possible combinations of one or more . . . " of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A power tailgate assembly for a vehicle, comprising:
a tailgate connected to the vehicle by a pivotal connection, the tailgate having an open position, a closed position, and a removal position;
a motor assembly connected to the tailgate and configured to cause the tailgate to move between the closed position and the open position;
one or more sensors configured to detect a movement of the tailgate;

one or more processors; and
a memory communicably connected to the one or more processors and storing a control logic module including instructions that when executed by the one or more processors cause the one or more processors to control the motor assembly to restrain the movement of the tailgate and to return the tailgate to the open position when the one or more processors determine that: 1) the tailgate is in the open position, 2) the vehicle is being driven, and 3) the one or more sensors detect that the tailgate has moved from the open position more than a threshold amount.

2. The power tailgate assembly of claim 1, wherein the pivotal connection is configured to allow the tailgate to be removed from the vehicle when the tailgate is pivoted to the removal position.

3. The power tailgate assembly of claim 1, wherein the motor assembly comprises:
a hinge arm connected to the tailgate; and
a spindle drive connected to the hinge arm, the spindle drive configured to drive the hinge arm to cause the tailgate to move between the closed position and the open position.

4. The power tailgate assembly of claim 1, wherein the one or more sensors comprise a plurality of Hall sensors.

5. The power tailgate assembly of claim 4, wherein the plurality of Hall sensors comprise a first Hall sensor disposed on a rotary element of the motor assembly and a second Hall sensor disposed on the rotary element such that, when the first Hall sensor produces a first output signal and the second Hall sensor produces a second output signal, the second output signal from the second Hall sensor is phase-shifted approximately 90 degrees relative to the first output signal from the first Hall sensor.

6. The power tailgate assembly of claim 4, wherein the motor assembly comprises:
a hinge arm connected to the tailgate; and
a spindle drive connected to the hinge arm, the spindle drive configured to drive the hinge arm to cause the tailgate to move between the closed position and the open position, the spindle drive comprising:
an upper housing;
a lower housing attached to the hinge arm;
a spindle nut disposed in the lower housing and attached thereto;
a spindle screw extending from the lower housing, through the spindle nut, into the upper housing;
a gear box disposed in the upper housing and attached thereto; and
a motor disposed in the upper housing and attached thereto.

7. The power tailgate assembly of claim 1, wherein the control logic module further includes instructions to determine that the vehicle is being driven when a transmission of the vehicle is shifted out of park.

8. The power tailgate assembly of claim 1, wherein the control logic module further includes instructions to determine that the vehicle is being driven when a moving speed of the vehicle is greater than a predetermined speed threshold.

9. A method of operating a power tailgate assembly for a vehicle, comprising:
an operation of detecting that a tailgate, connected to the vehicle by a pivotal connection and having an open position, a closed position, and a removal position, is in the open position;
an operation of detecting that the vehicle is being driven;
an operation of detecting, by one or more sensors, a movement of the tailgate from the open position; and
in response to determinations that the tailgate is in the open position, the vehicle is being driven, and the tailgate has moved from the open position more than a threshold amount, an operation of controlling a motor assembly to restrain the movement of the tailgate and to return the tailgate to the open position.

10. The method of claim 9, wherein the motor assembly comprises a spindle drive connected to a hinge arm which is connected to the tailgate and is configured to move the tailgate between the closed position and the open position.

11. The method of claim 9, wherein the one or more sensors comprises a first Hall sensor and a second Hall sensor and the operation of detecting the movement of the tailgate comprises detecting a first signal from the first Hall sensor and a second signal from the second Hall sensor.

12. The method of claim 9, wherein the operation of detecting that the vehicle is the being driven comprises detecting that a transmission of the vehicle is shifted out of park.

13. The method of claim 9, wherein the operation of detecting that the vehicle is the being driven comprises detecting that a moving speed of the vehicle is greater than a predetermined speed threshold.

14. A vehicle including a power tailgate assembly, the power tailgate assembly comprising:
a tailgate connected to the vehicle by a pivotal connection, the tailgate having an open position, a closed position, and a removal position;
a motor assembly connected to the tailgate, the motor assembly configured to cause the tailgate to move between the closed position and the open position;
one or more sensors configured to detect a movement of the tailgate and a speed of the movement of the tailgate;
one or more processors; and
a memory communicably connected to the one or more processors and storing a control logic module including instructions that when executed by the one or more processors cause the one or more processors to control the motor assembly to restrain the movement of the tailgate and to return the tailgate to the open position when the one or more processors determine that: 1) the tailgate is in the open position, 2) the vehicle is being driven, and 3) the one or more sensors detect that the tailgate has moved from the open position more than a threshold amount.

15. The vehicle of claim 14, wherein the pivotal connection is configured to allow the tailgate to be removed from the vehicle when the tailgate is pivoted to the removal position.

16. The vehicle of claim 14, wherein the motor assembly comprises:
a hinge arm connected to the tailgate; and
a spindle drive connected to the hinge arm, the spindle drive configured to drive the hinge arm to cause the tailgate to move between the closed position and the open position.

17. The vehicle of claim 14, wherein the one or more sensors comprise a plurality of Hall sensors.

18. The vehicle of claim 17, wherein the plurality of Hall sensors comprise a first Hall sensor disposed on a rotary element of the motor assembly and a second Hall sensor disposed on the rotary element such that, when the first Hall sensor produces a first output signal and the second Hall sensor produces a second output signal, the second output signal from the second Hall sensor is phase-shifted approximately 90 degrees relative to the first output signal from the first Hall sensor.

19. The vehicle of claim 14, wherein the control logic module further includes instructions to determine that the vehicle is being driven when a transmission of the vehicle is shifted out of park.

20. The vehicle of claim 14, wherein the control logic module further includes instructions to determine that the vehicle is being driven when a moving speed of the vehicle is greater than a predetermined speed threshold.

\* \* \* \* \*